(12) United States Patent
Jeffrey et al.

(10) Patent No.: US 7,421,130 B2
(45) Date of Patent: Sep. 2, 2008

(54) METHOD AND APPARATUS FOR STORING IMAGE DATA USING AN MCU BUFFER

(75) Inventors: Eric Jeffrey, Richmond (CA); Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 819 days.

(21) Appl. No.: 10/876,966

(22) Filed: Jun. 25, 2004

(65) Prior Publication Data
US 2005/0286775 A1  Dec. 29, 2005

(51) Int. Cl.
*G06K 9/36* (2006.01)
*G06K 9/60* (2006.01)
*G06K 9/46* (2006.01)

(52) U.S. Cl. ...................................... 382/232; 382/305

(58) Field of Classification Search .................. 382/162, 382/164, 166, 232, 276, 277, 305, 248, 233; 345/503, 531, 542, 545, 553, 565
See application file for complete search history.

(56) References Cited

U.S. PATENT DOCUMENTS

| | | | |
|---|---|---|---|
| 5,193,003 A | 3/1993 | Kondo | |
| 5,237,646 A | 8/1993 | Bunce | |
| 5,359,694 A * | 10/1994 | Concordel | ................. 358/445 |
| 5,543,823 A | 8/1996 | Kurisu | |
| 5,671,440 A | 9/1997 | Curry | |
| 5,754,710 A | 5/1998 | Sekine | |
| 5,801,776 A | 9/1998 | Tamura et al. | |
| 5,806,072 A * | 9/1998 | Kuba et al. | ................. 707/200 |
| 5,809,174 A | 9/1998 | Purcell et al. | |
| 5,977,947 A | 11/1999 | Potu | |
| 6,002,411 A | 12/1999 | Dye | |
| 6,067,098 A | 5/2000 | Dye | |
| 6,151,074 A | 11/2000 | Werner | |
| 6,212,300 B1 | 4/2001 | Rengakuji | |
| 6,263,119 B1 | 7/2001 | Martucci | |
| 6,333,951 B1 | 12/2001 | Tamura et al. | |
| 6,348,925 B1 | 2/2002 | Potu | |
| 6,559,826 B1 * | 5/2003 | Mendelson et al. | ......... 345/102 |
| 6,573,901 B1 | 6/2003 | Rai | |
| 6,931,069 B2 * | 8/2005 | Hatano et al. | .......... 375/240.24 |
| 7,136,193 B2 * | 11/2006 | Takata et al. | ................. 358/1.9 |
| 7,202,917 B2 | 4/2007 | Katoh et al. | |
| 2002/0085767 A1 | 7/2002 | Epstein et al. | |
| 2002/0131084 A1 | 9/2002 | Andrew et al. | |
| 2002/0135585 A1 | 9/2002 | Dye et al. | |
| 2002/0180744 A1 | 12/2002 | Takala et al. | |

(Continued)

FOREIGN PATENT DOCUMENTS

GB  2345400  7/2000

(Continued)

*Primary Examiner*—Amir Alavi
(74) *Attorney, Agent, or Firm*—Mark P. Watson

(57) ABSTRACT

The invention is directed to a method and apparatus for storing image data received in a block-interleaved format using an MCU buffer. A first minimum coded unit of the image data is stored in a first memory. The image data in the first minimum coded unit is grouped into pixels. The grouped image data is stored in a second memory as a second minimum coded unit of the image data. Preferably, the image data is converted from a first color format to a second color format. Further, the image is preferably dimensionally transformed.

23 Claims, 8 Drawing Sheets

U.S. PATENT DOCUMENTS

| | | | |
|---|---|---|---|
| 2003/0048951 A1 | 3/2003 | Rengakuji et al. | |
| 2003/0117513 A1 | 6/2003 | Anderson | |
| 2005/0001857 A1* | 1/2005 | Nakakita et al. | 345/690 |
| 2005/0063597 A1* | 3/2005 | Mao et al. | 382/232 |
| 2005/0286775 A1* | 12/2005 | Jeffrey et al. | 382/232 |

FOREIGN PATENT DOCUMENTS

| | | |
|---|---|---|
| JP | 2002135596 | 5/2002 |
| JP | 2004165733 | 6/2004 |
| WO | 0191039 A1 | 11/2001 |

* cited by examiner

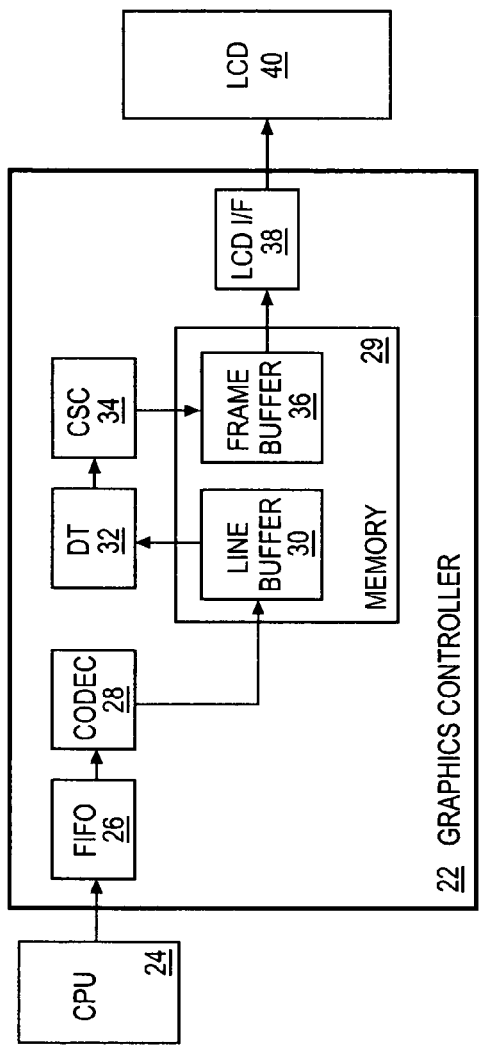
FIG. 1
(PRIOR ART)
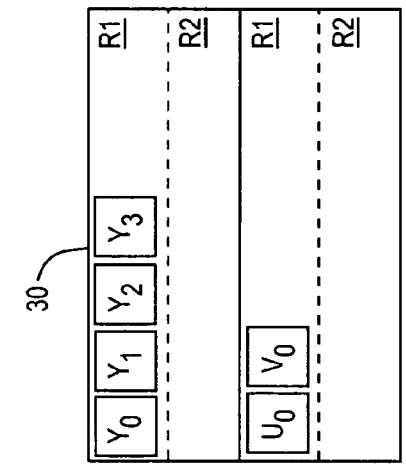
FIG. 9c
(PRIOR ART)
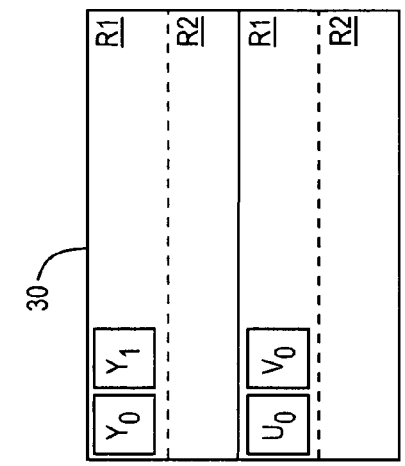
FIG. 9b
(PRIOR ART)
FIG. 9a
(PRIOR ART)

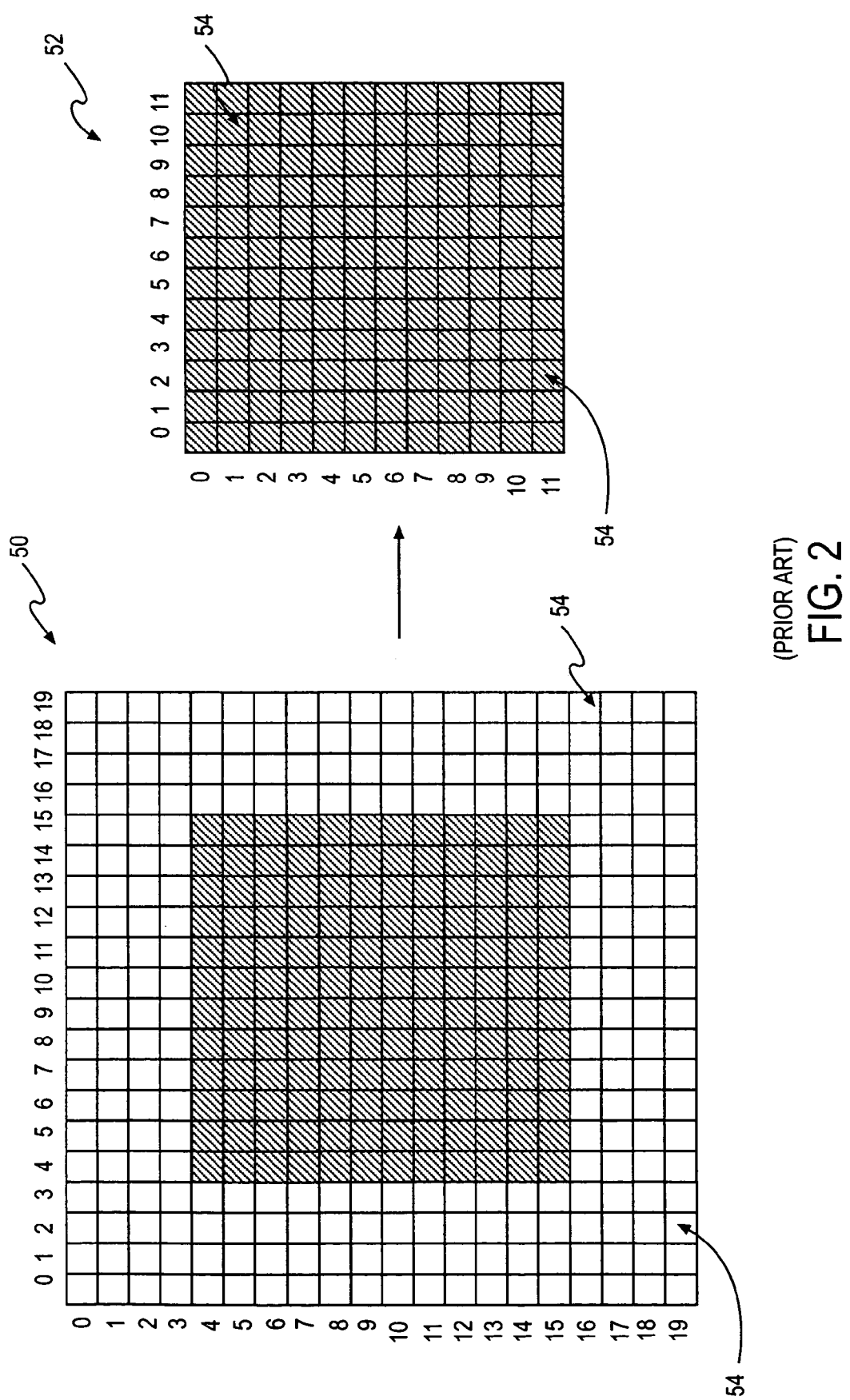
FIG. 2 (PRIOR ART)

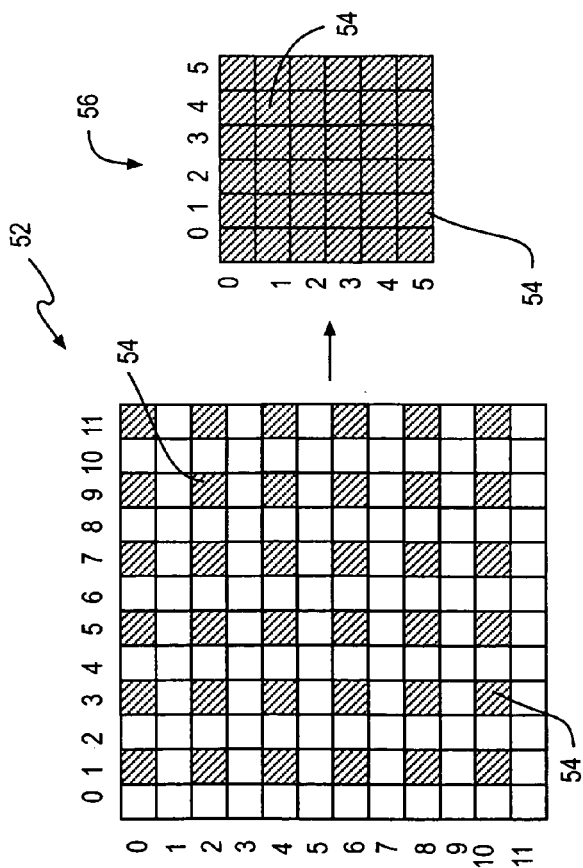
FIG. 3 (PRIOR ART)
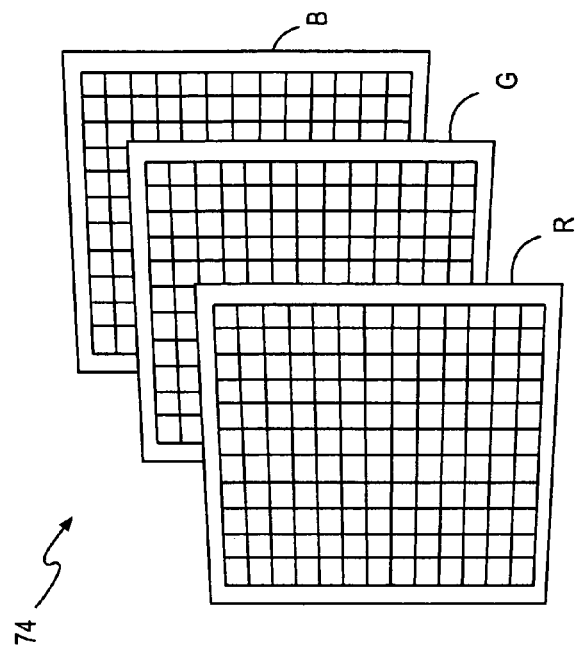
FIG. 4 (PRIOR ART)
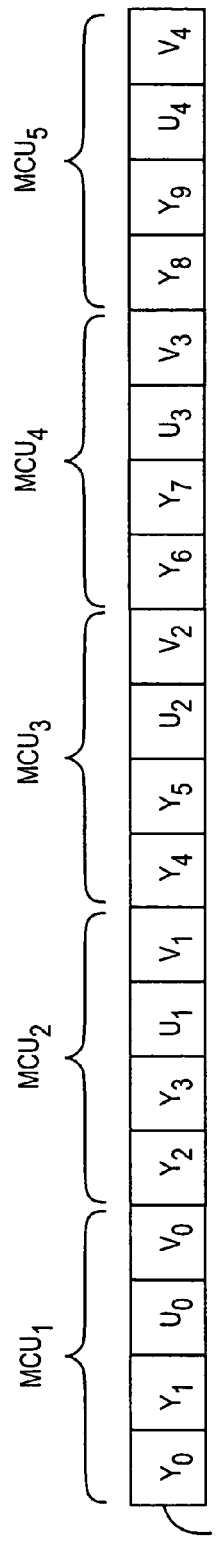
FIG. 8
4:2:2 (PRIOR ART)

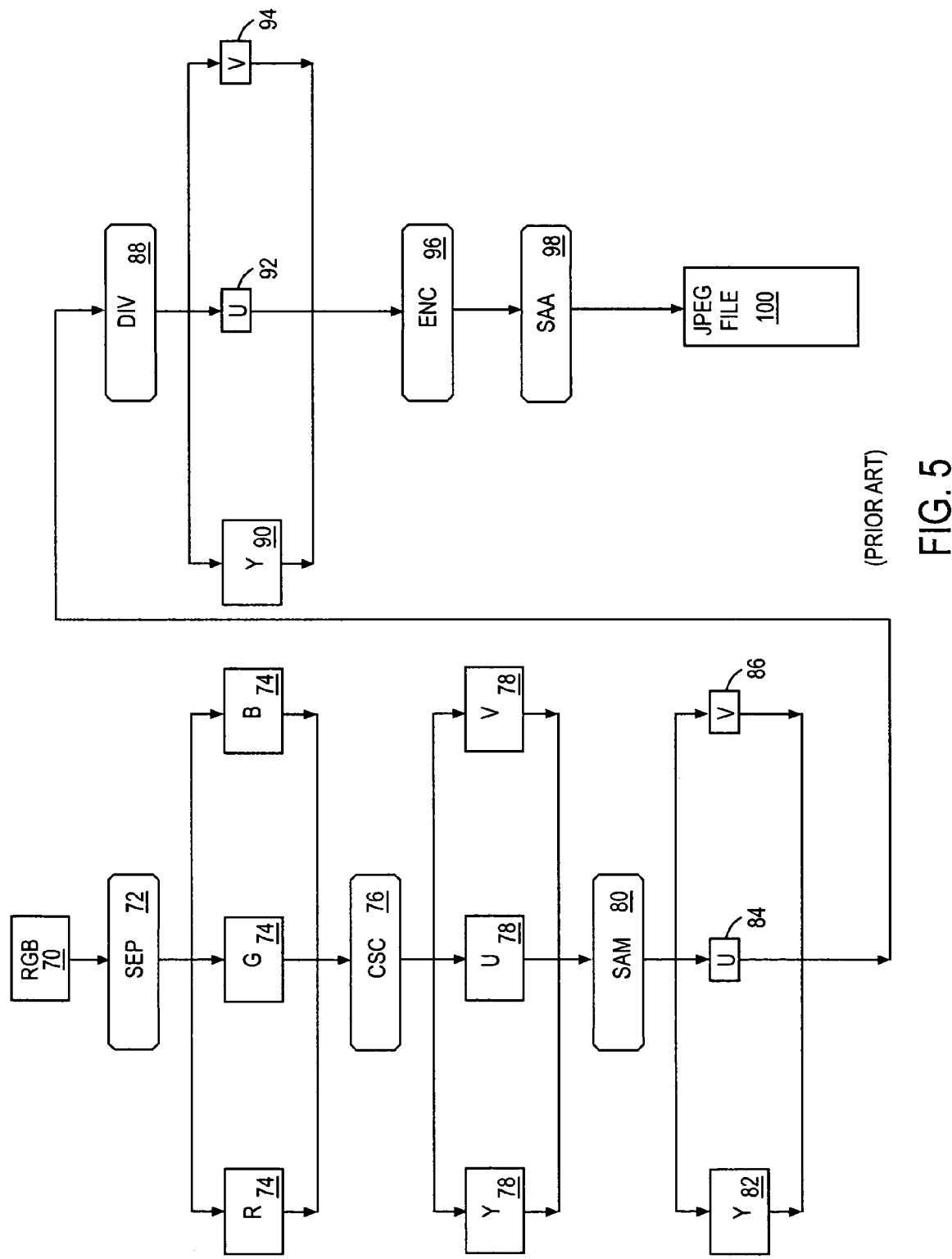
FIG. 5 (PRIOR ART)

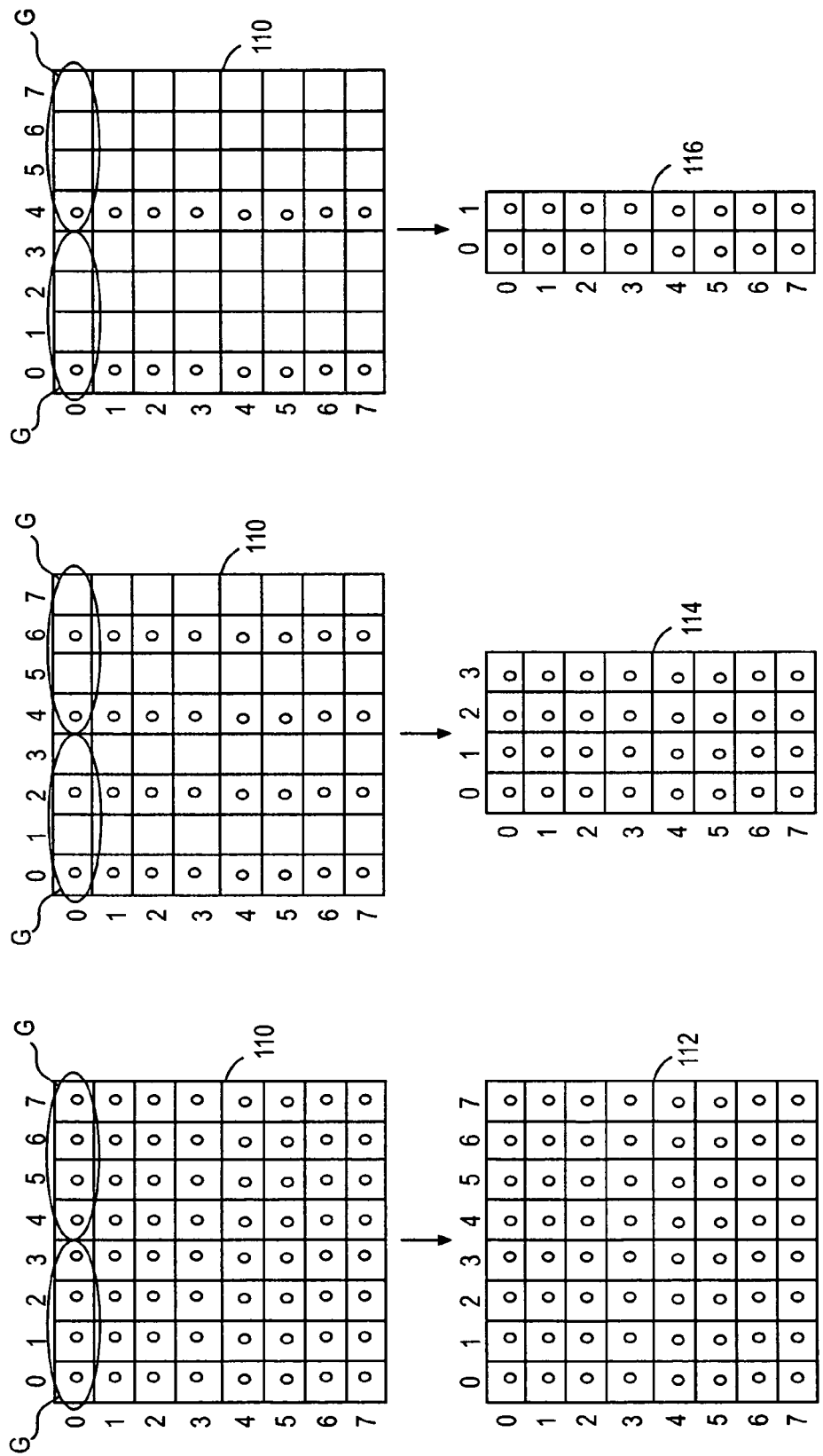
FIG. 6a (PRIOR ART)
FIG. 6b (PRIOR ART)
FIG. 6c (PRIOR ART)

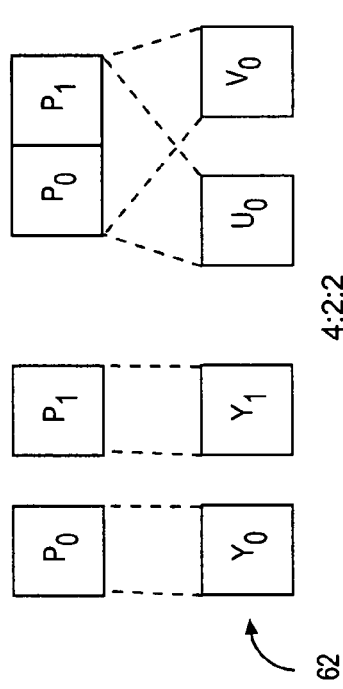
FIG. 7c (PRIOR ART) 4:2:2
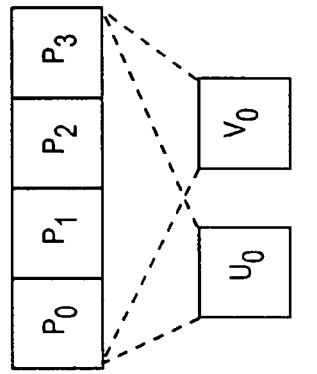
FIG. 7d (PRIOR ART) 4:1:1
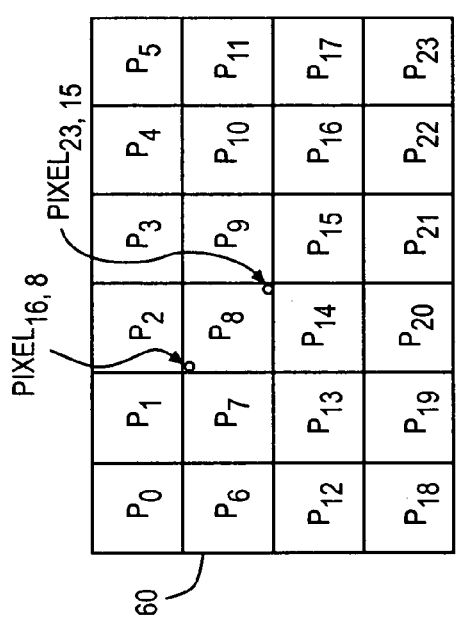
FIG. 7a (PRIOR ART)
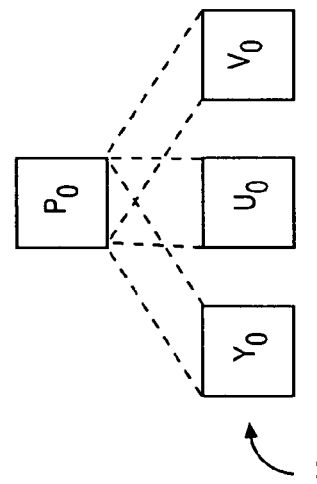
FIG. 7b (PRIOR ART) 4:4:4

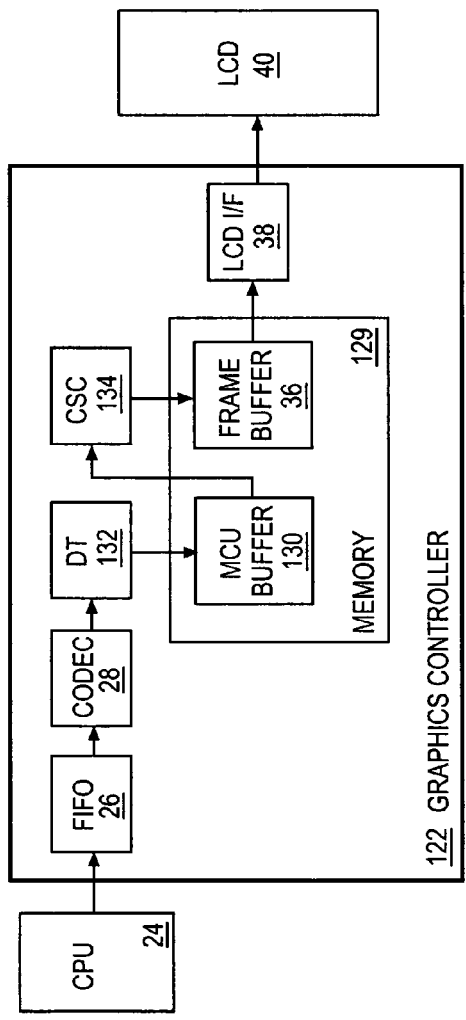
FIG. 10
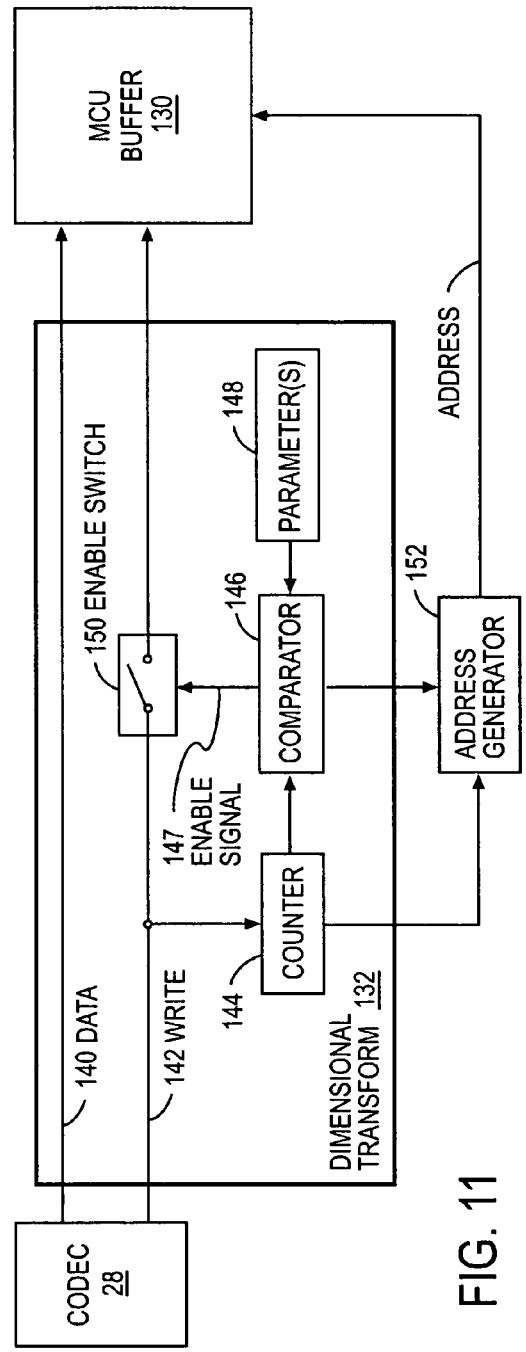
FIG. 11

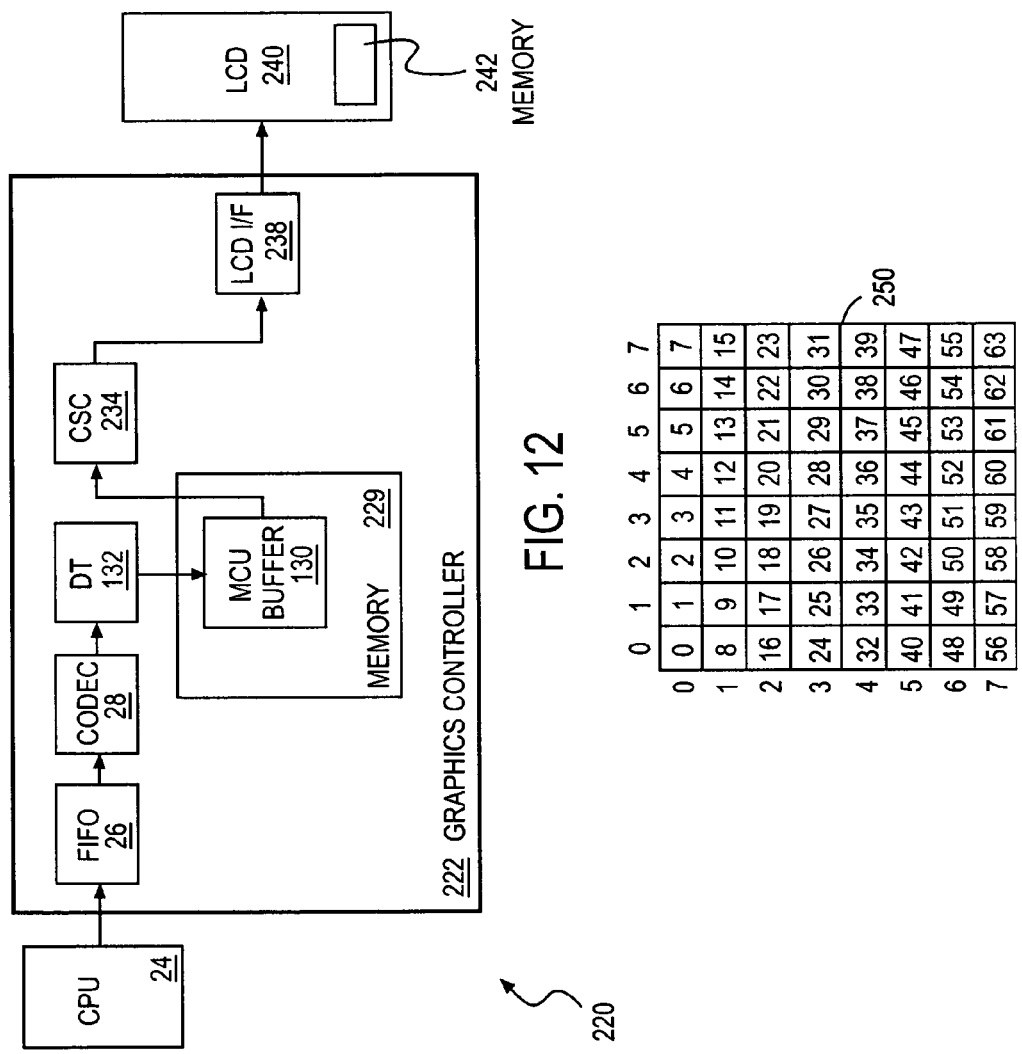
FIG. 12
(PRIOR ART)
FIG. 13

METHOD AND APPARATUS FOR STORING IMAGE DATA USING AN MCU BUFFER

FIELD OF THE INVENTION

The present invention relates generally to image processing, and more particularly to a method and apparatus for storing image data received in a block-interleaved format using an MCU buffer.

BACKGROUND OF THE INVENTION

The term "computer system" today applies to a wide variety of devices. The term includes mainframe and personal computers, as well as battery-powered computer systems, such as personal digital assistants and cellular telephones. In computer systems, a graphics controller is commonly employed to couple a CPU to a display device, such as a CRT or an LCD. The graphics controller performs certain special purpose functions related to processing image data for display so that the CPU is not required to perform such functions. For example, the graphics controller may include circuitry for decompressing image data as well as an embedded memory for storing it.

Display devices receive image data arranged in raster sequence and render it in a viewable form. A raster sequence begins with the left-most pixel on the top line of an array of pixels, proceeds pixel-by-pixel from left to right, and when the end of the top line is reached proceeds to the second line, again beginning with the left-most pixel. The sequence continues in this manner to each successively lower line until the end of the last line is reached.

In a display device, an image is formed from an array, often referred to as a frame, of small discrete elements known as "pixels." The term, however, has another meaning; pixel refers to the elements of image data used to define a displayed pixel's attributes, such as its brightness and color. For example, in a digital color image, pixels are commonly comprised of 8-bit component triplets, which together form a 24-bit word that defines the pixel in terms of a particular color model. A color model is a method for specifying individual colors within a specific gamut of colors and is defined in terms of a three-dimensional Cartesian coordinate system (x, y, z). The RGB model is commonly used to define the gamut of colors that can be displayed on an LCD or CRT. In the RGB model, each primary color—red, green, and blue—represents an axis, and particular values along each axis are added together to produce the desired color. Similarly, pixels in display devices have three elements, each for producing one primary color, and particular values for each component are combined to produce a displayed pixel having the desired color. In a digital gray scale image, a single 8-bit component defines each pixel.

Image data requires considerable storage and transmission capacity. For example, consider a single 512×512 color image comprised of 24-bit pixels. The image requires 768 K bytes of memory and, at a transmission rate of 128 K bits/second, 48 seconds for transmission. While it is true that memory has become relatively inexpensive and high data transmission rates more common, the demand for image storage capacity and transmission bandwidth continues to grow apace. Further, larger memories and faster processors increase energy demands on the limited resources of battery-powered computer systems. One solution to this problem is to compress the image data before storing or transmitting it. The Joint Photographic Experts Group (JPEG) has developed a popular method for compressing still images. Using a JPEG coding method, a 512×512 color image can be compressed into a JPEG file that may be only 40-80 K bytes in size (depending on the compression rate and the visual properties of the particular image) without creating visible defects in the image when it is displayed.

Before JPEG coding of a color image, the pixels are commonly converted from the RGB color model to a YUV model. In addition, a color source image is separated into component images, that is, Y, U, and V images. (Of course, this step is not necessary if the source image is a gray-scale image as these images have only one component.)

The JPEG standard employs a forward discrete cosine transform (DCT) as one step in the compression (or coding) process and an inverse DCT as part of the decoding process. In an image, pixels and their components are distributed at equally spaced intervals. Just as an audio signal may be sampled at equally spaced time intervals and represented in a graph of amplitude versus time, pixel components may be viewed as samples of a visual signal, such as brightness, and plotted in a graph of amplitude versus distance. The audio signal has a time frequency. The visual signal has a spatial frequency. Moreover, just as the audio signal can be mapped from the time domain to the frequency domain using a Fourier transform, the visual signal may be mapped from the spatial domain to the frequency domain using the forward DCT. The human auditory system is often unable to perceive certain frequency components of an audio signal. Similarly, the human visual system is frequently unable to perceive certain frequency components of a visual signal. JPEG coding recognizes that the data needed to represent unperceivable components may be discarded allowing the quantity of data to be reduced.

According to the JPEG standard, the smallest group of data units coded in the DCT is a minimum coded unit (MCU), which comprises three or more blocks for a YUV image and one block for a gray-scale image. A "block" is an 8×8 array of "samples," a sample being one element in the two-dimensional array that describes a component. Every sample in each component image may be selected for JPEG compression. In this case, the MCU for a YUV image comprises three blocks, one for each component. Commonly, however, a subset of the samples in the U and V blocks are selected for compression. This step is often referred to as chroma sub-sampling. For instance, only 50% or 25% of the samples in the U and V components may be selected (chroma sub-sampled) for compression. In these cases, the MCU comprises four blocks and six blocks, respectively. The phrase "sampling format" is used to distinguish among the various types of chroma sub-sampling. Typical sampling formats are 4:4:4, 4:2:2, 4:2:0, and 4:1:1, which are further described below. The blocks for each MCU are grouped together in an ordered sequence, e.g. $Y_0U_0V_0$ or $Y_0Y_1U_0V_0$, where the subscript denotes the block. The MCUs are arranged in an alternating or interleaved sequence before being compressed, and this data format is referred to as "block-interleaved."

When a JPEG file is received, it is normally decoded by a special purpose block of logic known as a CODEC (compressor/decompressor). The output from the decoding process is block-interleaved image data. As the CODEC is adapted to work in many different computer systems, it is not designed to output image data in any format other than the block-interleaved format. Display devices, however, are not adapted to receive block-interleaved image data; rather display devices expect pixels arranged in raster sequence. Moreover, operations performed by the graphics controller before the pixels are provided to the display, such as resizing and color space conversion, are adapted to be performed on raster-ordered pixels.

In order that the image data can be operated on and provided to the display as raster ordered pixels, the output of the CODEC, that is, the block-interleaved image data, is normally stored as blocks in a memory commonly referred to as a line buffer. As the image data for any particular pixel is needed, three samples are fetched from respective component blocks that are stored in scattered locations in the line buffer. The samples are assembled into pixels, processed, and stored in raster sequence in a memory, usually referred to as a display or frame buffer. Pixels are then sequentially fetched from the frame buffer and provided to the display device.

The line buffer must be large enough to hold at least one line of pixels of the image. The reason is that the graphics controller is designed to operate on raster ordered data. Moreover, the line buffer generally must be large enough to hold at least two display lines. The reason is that one line is read from the line buffer while another is being stored by the CODEC in a "ping-pong" scheme. Because JPEG decoded block-interleaved image data is made up of 8×8 blocks of samples, it is not possible to simply store a single line. Instead, the number of blocks needed to assemble a line must be stored. This is the same number as the number of blocks sufficient to store 8 lines. In other words, to store one line, the line buffer must be large enough to hold 8 lines. And to alternately store one line while another is being read in ping-pong fashion, the line buffer must be large enough to store 16 lines.

Because the line buffer must be able to hold at least 16 lines of image data, it requires a considerable amount of memory. Further, the size of a line buffer embedded in a graphics controller is predetermined when the integrated circuit (IC) is designed. Because the maximum width of a source image that can be JPEG decoded is limited by the size of the line buffer, the only way to provide the flexibility for handling source images of varying sizes is to provide a line buffer that is large enough to hold the largest expected image width.

In addition to the requirement in known computer systems for a large line buffer, a large frame buffer is also required. It must be large enough to store an entire image. The frame buffer is often embedded in a graphics controller and thus a large portion of the IC may be dedicated to the frame buffer. This can be a waste of memory, however. In some computer systems, the display device itself includes a memory for storing the image. In these systems, the frame buffer in the graphics controller is duplicative.

Memory is expensive in terms of the physical space and the power it requires. For these reasons, it would be desirable to reduce the amount of memory required for the line buffer. Moreover, it would be desirable to provide the flexibility to decompress JPEG coded images of various sizes without having to create an IC in which the line buffer is large enough to accommodate the largest expected image width even though narrower images are commonly processed. Further, it would be desirable to eliminate the frame buffer embedded in a graphics controller whenever possible. Accordingly, there is a need for a method and apparatus for storing image data received in a block-interleaved format using an MCU buffer.

BRIEF SUMMARY OF THE INVENTION

The invention is directed to a method and apparatus for storing image data received in a block-interleaved format using an MCU buffer.

The method comprises: (a) storing a first minimum coded unit of the image data in a first memory; (b) grouping the image data in the first minimum coded unit into pixels; and (c) storing the grouped image data in a second memory as a second minimum coded unit of the image data. Preferably, the method includes converting the image data from a first color format to a second color format. Further, the step of storing the first minimum coded unit preferably includes dimensionally transforming the image. The method may be performed in an integrated circuit, and the step of storing the grouped image data in the second memory may include storing the image data in a second memory located off-chip of the integrated circuit.

The apparatus comprises a first memory, a second memory, and a device. The first memory is for storing a first minimum coded unit of image data. The second memory is for storing a second minimum coded unit of image data. The device groups the image data in the first memory into pixels and stores the grouped image data in the second memory as the second minimum coded unit. Preferably, the first minimum coded unit includes image data in a first color format, and the device converts the image data from the first color format to a second color format for storage as the second minimum coded unit. Further, the apparatus preferably includes a dimensional transform device for dimensionally transforming the image. The first memory and the device may be provided in an integrated circuit with the second memory being provided off-chip, preferably in a display device.

The objectives, features, and advantages of the invention will be more readily understood upon consideration of the following detailed description of the invention, taken in conjunction with the accompanying drawings.

BRIEF DESCRIPTION OF THE SEVERAL VIEWS OF THE DRAWINGS

FIG. 1 is a block diagram of a computer system for receiving and decoding a JPEG file, processing decoded image data for display, and displaying a source image.

FIG. 2 is a view of an original and a cropped frame.

FIG. 3 is a view of the cropped frame of FIG. 3 and a scaled frame.

FIG. 4 is a perspective view of a frame as a set of pixel planes.

FIG. 5 is a block diagram illustrating the creation of a JPEG file.

FIGS. 6a-6c illustrate, respectively, three exemplary methods for selecting samples from a component image.

FIGS. 7a-7d illustrate a source image and blocks formed by selecting samples from the source image according to three exemplary sampling formats.

FIG. 8 shows a block-interleaved JPEG file.

FIGS. 9a-c illustrate how MCUs created according to a first, second, and third sampling formats may be stored in a line buffer.

FIG. 10 is a block diagram of a computer system for storing image data received in a block-interleaved format using an MCU buffer according to one preferred embodiment of the invention.

FIG. 11 is a block diagram of the dimensional transform circuit of FIG. 10.

FIG. 12 is a block diagram of a computer system for storing image data received in a block-interleaved format using an MCU buffer according to an alternative preferred embodiment of the invention.

FIG. 13 is a diagram of a block of samples illustrating the order in which samples are arranged.

DETAILED DESCRIPTION OF A PREFERRED EMBODIMENT

The invention is directed to a method and apparatus for storing image data received in a block-interleaved format using an MCU buffer. This specification describes the present preferred embodiments of the invention, examples of which are illustrated in the accompanying drawings. Wherever possible, the same reference numbers are used in the drawings and the description to refer to the same or like parts, blocks, and steps.

FIG. 1 illustrates a block diagram of a computer system 20 having a graphics controller 22 coupled to a CPU 24 and an LCD 40. FIG. 1 is but one preferred context for the invention. The graphics controller 22 includes a FIFO memory 26, used for buffering data received from the CPU 24, and a CODEC 28. In addition, the graphics controller 22 includes an embedded memory 29, part of which is set aside as a line buffer 30 and another part of which is set aside as a frame buffer 36. The graphics controller 22 also includes a dimensional transform ("DT") circuit 32, a color space conversion ("CSC") circuit 34, and an LCD interface ("I/F") circuit 38.

By way of additional background, the transformation operations performed by dimensional transform circuit 32 and the format of the image data will be described before the operation of computer system 20 is described.

FIG. 2 shows one type of dimensional transformation operation that may be performed on a frame before it is displayed on a display device. This is a cropping operation. An original frame 50 and a cropped frame 52 are illustrated in FIG. 2. Each frame comprises a plurality of pixels 54, each pixel being represented by a square. The coordinate position of a particular pixel 54 is given by the numbers along the top and left side of the frame. The amount by which an image is cropped is determined by a set of cropping parameters. Specifically, the cropping parameters define which areas are to be removed from the original frame 50 and may be specified in terms of coordinate values. For example, the cropping parameters may be start and stop pixels in the horizontal and vertical directions. For instance, if in the original frame 50 a distance equal to a four pixels is to be removed from the top, bottom, and each side of the frame, the coordinates of the start pixel are (4, 4) and that of the stop pixel are (15, 15).

FIG. 3 illustrates another dimensional transformation operation that may be performed on a frame before it is displayed. FIG. 3 shows a scaling operation. The amount by which an image is scaled is determined by a scale factor. For example, if the cropped frame 52 is to be reduced to one-fourth its original size, the scale factor is one-half. An image may be scaled using any one of a number of algorithms. When an image is scaled according to a simple linear algorithm using a scale factor of one-half, every other row of pixels 54 is discarded and every other pixel within a row is discarded. Scaling the cropped frame 52 using this linear algorithm and a scale factor of one-half produces the cropped and scaled frame 56. To illustrate the mapping of rows of pixels 54 and pixels within rows that are not discarded, FIG. 3 also shows the coordinates of two exemplary pixels ([2, 9] and [10, 3]) in frame 52 and the location of these pixels in the scaled frame 56. The phrase "dimensional transform" is used herein to refer operations that change the size of a frame either by cropping the frame, scaling it, or both. The term is intended to include any algorithm for cropping, scaling, and other similar operations that are now known or later become known in the art.

FIG. 4 shows a view of a frame of pixels that is believed to be helpful for understanding the context of the invention. As mentioned, the numeric value defining the attributes of an RGB pixel on a display device is commonly represented by a 3-byte word, one byte representing each color component. In FIG. 4, three component images 74 are shown, that is, all of the R components of the pixels are shown at their respective coordinate locations in an R frame, all of the G components are shown in a G frame, and all of the B components are shown in a B frame. Component images such as those shown in FIG. 4 are sometimes referred to as "pixel planes." Similar pixel planes may be formed with images represented in other color models, such as YUV.

FIG. 5 is a block diagram showing aspects of the creation of a JPEG file. Generally, the creation of a JPEG file begins with a source image 70 in RGB format. A first step 72 ("SEP") separates the RGB image into R, G, and B component images 74. The component images 74 correspond to the pixel planes of FIG. 4 and one pixel plane 74 is created for each of the color components. The second step 76 ("CSC") converts the R, G, and B pixel planes 74 into Y, U, and V component images 78.

In a step 80 ("SAM") of chroma sub-sampling the U and V pixel planes 78 are chroma sub-sampled according to a predetermined sampling format. Commonly, the sampling format is 4:4:4, 4:2:2, 4:1:1, or 4:2:0. In the 4:4:4 sampling format, each of the Y, U, and V samples are selected for compression, respectively, from the Y, U, and V pixel planes. In other words, if the sampling format is 4:4:4, one hundred percent of the U and V samples are selected. If the sampling format is 4:2:2, again all of the Y samples are selected, but only fifty percent of the U, and V samples are selected.

FIGS. 6a-c depict how samples are selected in the step 80 ("SAM") of chroma sub-sampling according to three exemplary horizontal sampling formats. Each block 110 is an 8×8 matrix of Y, U, or V samples. In the JPEG process, samples are selected from a block, which is always an N×N (square) matrix. Each sample is represented by a square within the block, and a circle within the square indicates that the sample is selected. A square which does not have a circle in it is not selected, that is, it is discarded. In each block, each row consists of two groups G of four consecutive samples.

In FIG. 6a, all of the samples in each group G of four are selected. In FIG. 6b, the first and third samples in each group G are selected. And, in FIG. 6c, only the first sample in each group is selected. Because blocks are 8×8, the collections of samples 114 and 116 are not large enough to form a square block. These collections are combined with similar collections of the same type of component to create an 8×8 block.

FIGS. 7a-d show the mapping of a source image 60 into component blocks 62. FIG. 7a shows source image 60. The image 60 comprises twenty-four 8×8 blocks of pixels $P_0$ to $P_{23}$. In FIG. 7b samples have been selected using a 4:4:4 sampling format. The component blocks $Y_0$, $U_0$, and $V_0$ are created from pixel block $P_0$ (as shown with dashed lines). In FIG. 7c samples have been selected using a 4:2:2 sampling format. The component blocks $Y_0$ and $Y_1$ are created, respectively, from pixel blocks $P_0$ and $P_1$. These pixel blocks also together create one 8×8 block of U samples and one 8×8 block of V samples, i.e., $U_0$ and $V_0$. In FIG. 7d, samples have been selected using a 4:1:1 sampling format. Four component blocks of Y are created from pixel blocks $P_0$ to $P_3$. But only one block each of U and V components are created from these four pixel blocks. The smallest group of data units coded in a forward DCT is an MCU. In these figures, the blocks 62 form an MCU for the specified sampling format.

Referring again to FIG. 5, each block is JPEG encoded in a step 96 ("ENC"), that is, each block is separately compressed according to a JPEG method. In a step 98 ("SAA"), compressed blocks of pixel components are selected and arranged into a JPEG file 100.

FIG. 8 illustrates a JPEG file 100. In the JPEG file 100, the image data is block-interleaved according to a 4:2:2 sampling format. The JPEG file 100 consists of two sequential blocks from the Y pixel plane 90, followed by one block from each of the U and V pixel planes 92, 94. This pattern is repeated until all of the blocks from all of the planes have been selected. If a different sampling format is used, the block-interleaved format will be modified accordingly.

FIG. 1 shows the path that image data takes from JPEG file format to raster ordered pixels ready for display. In operation, the CPU 24 writes a JPEG file to the FIFO 26. The CPU 24 is an illustrative device; the JPEG file may be written by another device, such as a camera, a network interface module, a memory controller, or any other device with data transfer capabilities. The CODEC 28 accesses the FIFO 26, decompresses the JPEG file using an inverse DCT-based process, and writes decoded block-interleaved image data to the line buffer 30.

FIGS. 9a-c illustrate one known way for storing block-interleaved image data in the line buffer 30. FIGS. 9a-c illustrate how MCUs created according to 4:4:4, 4:2:2, and 4:1:1 sampling formats may be stored in a line buffer. In the figures, the Y samples are stored in the first half of the line buffer 30, and the U and V blocks are stored in the second half. Each line buffer half is further divided into upper and lower regions R1 and R2. These regions are employed to alternately store blocks for one line while the blocks for another are being read in ping-pong fashion. The dimensional transform circuit 32 requires enough image data for a full row of pixels in order to begin its operation. While not shown in FIGS. 9a-c, the CODEC stores a sufficient number of blocks in the line buffer to form one full row of pixels. For example, a display having a width of 512 and a 4:4:4 sampling format would require 64 MCUs to form one full row of pixels.

The dimensional transform circuit 32 reads samples stored in the line buffer 30, assembles the samples into pixels, and after performing any desired dimensional transform operations, such as cropping and scaling, sends the pixels to the color space conversion circuit 34. To obtain any particular pixel, the dimensional transform circuit 32 must fetch samples from scattered locations of the memory 30. The color space conversion circuit 34 converts the pixel data into the RGB format and stores it in the frame buffer 36 in raster order. The LCD interface circuit 38 reads pixels from the frame buffer 36 and sends them in raster order to the display device 40 for display. The display device 40 is illustrated as an LCD; but a CRT or any similar device for rendering image data for viewing may be substituted.

FIG. 10 shows a block diagram of a computer system 120 having a graphics controller 122 in accordance with the principles of the invention. The graphics controller 122 is structurally somewhat similar to the graphics controller 22. An MCU buffer 130, however, replaces the line buffer 30. Moreover, the data path is altered. The dimensional transform circuit 132 receives decoded block-interleaved image data from the CODEC and stores resized image data in the MCU buffer 130. Further, the color space converter 134 fetches image data from the MCU buffer 130. Accordingly, the memory 129 is substantially smaller than the memory 29.

The dimensional transform circuit 132 crops or scales the image represented by the JPEG decoded block-interleaved data by under-sampling the image data. The CODEC 28 writes the Y, U, and V pixel components in block-interleaved format to the dimensional transform circuit 132. Unlike known dimensional transform circuit 32 which performs dimensional transform operations on a pixel-by-pixel basis, the dimensional transform circuit 132 performs dimensional transform operations on a sample-by-sample basis.

In FIG. 11, the dimensional transform circuit 132 is shown in greater detail. The DT circuit 132 includes a data receiver that includes, in a preferred embodiment, a data path 140 and a write path 142. The data path 140 is for receiving the stream of image data and presenting it to the MCU buffer 130. Preferably, the data path 140 is one byte wide, though it may be any width. The data path 140 may optionally include an appropriate memory structure, such as a register, for temporary storage of data. The DT circuit also includes a write path 142 for receiving an indication from the CODEC 28 that it has output a new byte (or other unit) of image data onto the data path 140. The write path is coupled via an enable switch 150 to the MCU buffer 130. A counter 144, which is preferably a byte counter is coupled to the write path 142 and is used to count incoming samples. The counter 144 assigns each sample a sequence number that enables the DT circuit 132 to determine what type of sample is received, as well as the row and column (x, y) coordinate position of the pixel associated with the sample. For example, when the count reaches 64, the DT circuit 132 recognizes that an entire 8×8 block of samples of one type of components has been received. The dimensional transform circuit 132 also uses the fact that the count has reached 64 to determine that the next component, that is, the $65^{th}$ byte, will be a component of a different type.

The dimensional transform circuit 132 also includes a comparator 146. The comparator 146 receives the output of the counter 144 and uses the computed (x, y) coordinate value of each sample to perform dimensional transform operations, such as cropping and scaling. Parameters used to define the cropping and scaling operation are preferably stored in parameter memory 148. The sequence number of a sample, or an equivalent (x, y) coordinate value, is compared to an appropriate parameter or parameters. (Typically, parameters are directly or indirectly selected prior to the dimensional transform operation by a user.) If the comparison indicates that the pixel associated with the sample is to be included in the dimensionally transformed image, the comparator generates a signal 147 to enable the write path 142. On the other hand, if the pixel is to be excluded from the image, the enable signal is not generated. The enable signal causes the enable switch 150 to close which in turn cause the write signal to be passed to the MCU buffer. When the MCU buffer receives the write signal, it stores the data present on the data path 140. If the MCU buffer does not receive a write signal, it does not store the data on the data path which may then be overwritten with the next sample.

The write enable signal 147 and switch 150 may be implemented in a variety of ways. While the enable signal and switch are one preferred embodiment, the invention is not limited to this particular implementation. Any hardware, software, or firmware that causes a sample to be stored or not stored in the MCU buffer based on the result of comparing the sequence number (or coordinate value) provided by the counter 144 to a predetermined dimensional transform parameter is contemplated.

The color space conversion circuit 134 fetches samples from the MCU buffer 130 (FIG. 10), groups them into pixels, and color converts the image data from YUV to RGB. The color space conversion circuit 134 differs from the prior art circuit 34 in that it includes logic for fetching samples from the Y, U, and V component blocks stored at scattered locations in the MCU buffer. Depending on timing requirements, it may be advantageous to provide the memory 129 as SRAM for the rapid access this type of memory provides. After fetching samples, grouping samples into pixels, and color converting the image data, the color space conversion circuit 134 stores the pixels in the frame buffer 36, preferably in raster sequence.

In summary, the graphics controller 122 receives, dimensionally transforms, color space converts a stream of block-interleaved image data, and stores pixels in a memory, such as a frame buffer, using an MCU buffer. Not only does this save physical space and power, because the MCU buffer is considerably smaller than a line buffer, the graphics controller 122 provides the flexibility to decode JPEG images of any size.

The invention is also directed to a method for receiving, dimensionally transforming, color space converting a stream of block-interleaved image data, and storing pixels in a memory, such as a frame buffer, using an MCU buffer The method may be embodied in hardware, firmware, software, or in a combination of these embodiments. Further, in another embodiment, this method may be embodied in a program of instructions and stored on a machine-readable medium. A machine, such as a computer system, reads the medium and executes the instructions to perform the method.

The machine performing the method stores a first minimum coded unit of the image data in a memory, such as an MCU buffer. The machine may dimensionally transform the image data as it stores it. The machine groups the image data in the minimum coded unit into pixels. The machine performing the method typically groups the data by determining which samples are needed to define a pixel and then reading those samples. The machine stores the grouped image data in another memory. The other memory is typically a frame buffer, which may be embedded in a graphics controller. Before storing the image data in the other memory, the machine preferably converts the data from a first to a second color format.

FIG. 12 shows another embodiment of a graphics controller 222 for storing image data received in a block-interleaved format using an MCU buffer. In this embodiment, the graphics controller 222 does not have a frame buffer. The color space converter 234 sends pixels directly to the LCD interface 238 and the LCD interface writes blocks of pixels (rather than raster ordered pixels) to the display device 240. The display device 240 differs from the display device 40 in that it includes a memory 242. Because the frame buffer is eliminated, the memory 229 is substantially smaller than the memory 129.

The memory 242 of display device 240 stores a full frame of pixel data. The display device 240 includes refresh circuitry for self-refreshing its display screen. This circuitry reads the pixel data stored in the memory 242 to update the display screen. The pixels in memory 242 are arranged in raster sequence. While the memory 242 is preferably embedded in the display device 240, it may be located separately from both the graphics controller 222 and the display device 240.

The graphics controller 222 can update the memory 242 independently of the refresh timing requirements prescribed for the display screen of the display device 240. Further, the graphics controller 222 can update the memory 242 with a full frame or any part of a frame. Thus, if only part of the image changes from frame-to-frame, the graphics controller only needs to update the part that changes. The procedure the graphics controller uses to update the memory 242 differs from the previously known procedure for refreshing a display device 40.

Previously, when updating the display device 40, the known graphics controller 22 would send a start address and an end address to the display device 40. The start address sent would be the address of the left-most pixel on the top line of the frame. The end address would be the address of the right-most pixel on the bottom line of the frame. The LCD interface 38 would then read, in raster order, the pixels stored in the frame buffer 36, writing each pixel to the display 40. The LCD interface 38 would write pixels to the display device, conforming to its timing requirements. As each new pixel was received, the display device 40 would forward the pixel to an incremented address in the display screen.

Like the known graphics controller 22, the LCD interface 238 of the graphics controller 222 also sends a start address and an end address to the display device 240. If the graphics controller 222 is preparing to send a block of pixels, the start address is the address of the left-most pixel on the top line of the block being sent. And the end address is the address of the right-most pixel on the bottom line of the block. The LCD interface 238 receives pixels from the color space converter 234. As it receives pixels, it writes them to the display device 240, which stores the pixels in the memory 242 at addresses incremented from the start address.

FIG. 13 shows the sequence in which pixels are sent from the color space converter 234 via the LCD interface 238 to the display device 240. FIG. 13 illustrates a block of pixels 250. A sequence number is shown inside each box, each box representing a pixel at a particular coordinate within the block. The shown sequence in which pixels are sent is further explained in the next paragraph.

In general, any block of pixels may be defined by two corner pixels $P_{X,\ Y}$ and $P_{X+N,\ Y+N}$, where X, Y, and N, are integers. The variables X and Y denote, respectively, arbitrary horizontal and vertical coordinates in the image. For example, assuming the pixels blocks shown in FIG. 7a are 8×8, the pixel block $P_8$ may be defined by corner pixels $P_{16,\ 8}$ and $P_{23,\ 15}$. Each pixel block includes a plurality of pixels $P_{X+n,\ Y+n}$, where n is an integer. For pixel block $P_8$, X is 15 and Y is 7, and n ranges sequentially from zero to N−1. Because the pixel block $P_8$ is N×N matrix, and if N equals 8, n ranges sequentially from 0 to 7. (In block 250, n also ranges sequentially from 0 to 7.) Using generalized terminology, the sequence in which pixels are sent comprises sending the pixels $P_{X,\ Y}$ to $P_{X+n,\ Y}$, then sending the pixels $P_{X,\ Y+1}$ to $P_{X+m,\ Y+1}$, m ranging sequentially from 0 to 7, and continuing in this pattern until all of the rows Y have been sent.

To illustrate, the pixels 0, 1, 2, 3, 4, 5, 6, 7, are sent first. The pixels 8, 9, 10, 11, 12, 13, 14, 15 are sent next. The pixels 16, 17, 18, 19, 20, 21, 22, 23 are then sent. And so on. The last eight pixels sent are 56, 57, 58, 59, 60, 61, 62, 63.

After it sends a block of pixels to the memory 242, the graphics controller 222 may send another block. The graphics controller 222 does this by first sending to the display device 240 a start and an end address for the new block. The new block of pixels may be any block in the image. The graphics controller 222 then sends the new block of pixels to the display device.

While not shown in FIG. 12, the LCD interface 238 includes a receiver for receiving pixels from the color space converter 238 and a transmitter for writing the pixels to the memory 242.

The invention is also directed to a method for receiving, dimensionally transforming, color space converting a stream of block-interleaved image data, and storing pixels in a memory, such as a memory in a display device, using an MCU buffer. This method may be embodied in hardware, firmware, software, or in a combination of these embodiments. Further, in another embodiment, this method may be embodied in a program of instructions stored on a machine-readable medium. A machine, such as a computer, reads the medium and executes the instructions to perform the method.

The machine performing the method stores a first minimum coded unit of the image data in a memory, such as an MCU buffer. The machine may dimensionally transform the image data as it stores it. The program groups the image data in the minimum coded unit into pixels. The machine typically groups the data by determining which samples are needed to define a pixel and then reading those samples. The machine stores the grouped image data in another memory. The other memory is located outside of an integrated circuit which holds the MCU buffer. Preferably, the other memory is part of a display device. Before storing the image data in the other memory, the machine preferably converts the data from a first to a second color format.

The invention has been illustrated with MCUs according to the 4:4:4, 4:2:2, and 4:1:1 sampling formats. The invention in not limited, however, to these exemplary sampling formats. The principles of the invention are equally applicable to other sampling formats, such as 4:2:0 or 4:0:0.

The invention has been illustrated with reference to the YUV and RGB color formats. The invention may be practiced with any color format or color model, such as CMY, YIQ, or CIE, or any variation on any color format or model. Further, the invention may be practiced with a gray-scale image.

The invention has been illustrated with an LCD. It will be appreciated that the invention may be practices with any similar or equivalent device for rendering a source image comprised of pixels, such as a CRT, an OLED, a plasma display, or a printer or other device for rendering hard copy images.

The terms and expressions that have been employed in the foregoing specification are used as terms of description and not of limitation, and are not intended to exclude equivalents of the features shown and described or portions of them. The scope of the invention is defined and limited only by the claims that follow.

The invention claimed is:

1. A method for storing two or more minimum coded units of decoded image data arranged in a block-interleaved format, each minimum coded unit corresponding with one 8×8 block of pixel data including at least two blocks of pixel components, comprising the steps of:
   storing a first minimum coded unit of the image data in a first memory;
   grouping the image data in the first minimum coded unit into pixel data; and
   storing the grouped pixel data in a second memory as a block, wherein the block of pixel data is defined by two corner pixels $P_{X,Y}$, and $P_{X+N, Y+N}$, where N is an integer, and X and Y are integers denoting two-dimensional coordinates of the pixels, and wherein the step of storing further comprises sequentially storing the pixels $P_{X,Y}$ to $P_{X+n, Y}$, where n is an integer that ranges from zero to N, and thereafter sequentially storing the pixels $P_{X, Y+1}$ to $P_{X+n, Y+1}$.

2. The method of claim 1, wherein the first minimum coded unit includes image data in a first color format, further comprising converting the image data from the first color format to a second color format for storage as the block of pixel data.

3. The method of claim 1, further comprising a step of dimensionally transforming the image data before the step of storing the first minimum coded unit.

4. The method of claim 1, wherein the method is performed in an integrated circuit, wherein the step of storing the grouped image data in a second memory includes storing the image data in a second memory located outside of the integrated circuit.

5. The method of claim 4, wherein the first memory has a capacity that is sufficient to store two minimum coded units, but which is insufficient to store three minimum coded units.

6. A computer-readable medium having a program of instructions stored on the medium, the instructions being executable by a machine, wherein, when the instruction are accessed by the machine, the machine performs a method of storing two or more minimum coded units of decoded image data arranged in a block-interleaved format, each minimum coded unit corresponding with one 8×8 block of pixel data and including at least two blocks of pixel components, the method comprising:
   storing a first minimum coded unit of the image data in a first memory;
   grouping the image data in the first minimum coded unit into pixel data; and
   storing the grouped pixel data in a second memory as a block, wherein the block of pixel data is defined by two corner pixels $P_{X,Y}$, and $P_{X+N, Y+N}$, where N is an integer, and X and Y are integers denoting two-dimensional coordinates of the pixels, and wherein the step of storing further comprises sequentially storing the pixels $P_{X,Y}$ to $P_{X+n, Y}$, where n is an integer that ranges from zero to N, and thereafter sequentially storing the pixels $P_{X, Y+1}$ to $P_{X+n, Y+1}$.

7. The medium of claim 6, wherein the first minimum coded unit includes image data in a first color format, further comprising converting the image data from the first color format to a second color format for storage as the block of pixel data.

8. The medium of claim 6, further comprising a step of dimensionally transforming the image data before the step of storing the first minimum coded unit.

9. The medium of claim 6, wherein the method is performed in an integrated circuit, wherein the step of storing the grouped image data in a second memory includes storing the image data in a second memory located outside of the integrated circuit.

10. The medium of claim 9, wherein the first memory has a capacity that is sufficient to store two minimum coded units, but which is insufficient to store three minimum coded units.

11. An apparatus for storing two or more minimum coded units of decoded image data arranged in a block-interleaved format, each minimum coded unit corresponding with one 8×8 block of pixel data and including at least two blocks of pixel components, comprising:
   a first memory to store a first minimum coded unit of the image data;
   a second memory to store pixel data; and
   a circut to group the image data stored in the first memory into pixel data and to store the grouped pixel data in the second memory as a block, wherein the block of pixel data is defined by two corner pixels $P_{X,Y}$, and $P_{X+N, Y+N}$, where N is an integer, and X and Y are intergers denoting two-dimensional coordinates of the pixels, and the circuit sequentially stores the pixels $P_{X,Y}$ to $P_{X+n, Y}$, where n is an integer that ranges from zero to N, and thereafter sequentially stores the pixels $P_{X, Y+1}$ to $P_{X+n, Y+1}$.

12. The apparatus of claim 11, wherein the first minimum coded unit includes image data in a first color format, and the circuit converts the image data from the first color format to a second color format for storage as the block of pixel data.

13. The apparatus of claim 11, wherein the circuit dimensionally transforms the first minimum coded unit before storing the first minimum coded unit.

14. The apparatus of claim 11, wherein the first memory and the first circuit are disposed in an integrated circuit and the second memory is provided off-chip.

15. The apparatus of claim 14, wherein the second memory is disposed in a display device.

16. The apparatus of claim 15, wherein the first memory has a capacity that is sufficient to store two minimum coded units, but which is insufficient to store three minimum coded units.

17. A system for storing two or more minimum coded units of decoded image data arranged in a block-interleaved format, each minimum coded unit corresponding with one 8×8 block of pixel data and including at least two blocks of pixel components, comprising:
- a central processing unit;
- a display device; and
- a graphics controller comprising:
  - a first memory to store a first minimum coded unit;
  - a second memory to store pixel data; and
  - a circuit to group the image data stored in the first memory into pixel data and to store the grouped pixel data in the second memory as a block, wherein the block of pixel data is defined by two corner pixels $P_{X, Y}$ and $P_{X+N, Y+N}$, where N is an integer, and X and Y are intergers denoting two-dimensional coordinates of the pixels, and the circut sequentially stores the pixels $P_{X, Y}$ to $P_{X+n, Y}$, where n is an interger that ranges from zero to N, and thereafter sequentially stores the pixels $P_{X, Y+1}$ to $P_{X+n, Y+1}$.

18. The system of claim 17, wherein the first minimum coded unit includes image data in a first color format, and the circuit converts the image data from the first color format to a second color format for storage as the block of pixel data.

19. The system of claim 17, wherein the circuit dimensionally transforms the first minimum coded unit before storing the first minimum coded unit.

20. The system of claim 17, wherein the first memory and the circuit are disposed in an integrated circuit and the second memory is provided off-chip.

21. The system of claim 20, wherein the second memory is disposed in the display device.

22. The system of claim 21, wherein the first memory has a capacity that is sufficient to store two minimum coded units, but which is insufficient to store three minimum coded units.

23. The apparatus of claim 21, wherein the second memory has a capacity that is sufficient to store one frame.

* * * * *